June 4, 1957 — O. R. NEMETH — 2,794,692
HIGH SPEED BEARING
Filed June 14, 1954 — 2 Sheets-Sheet 1
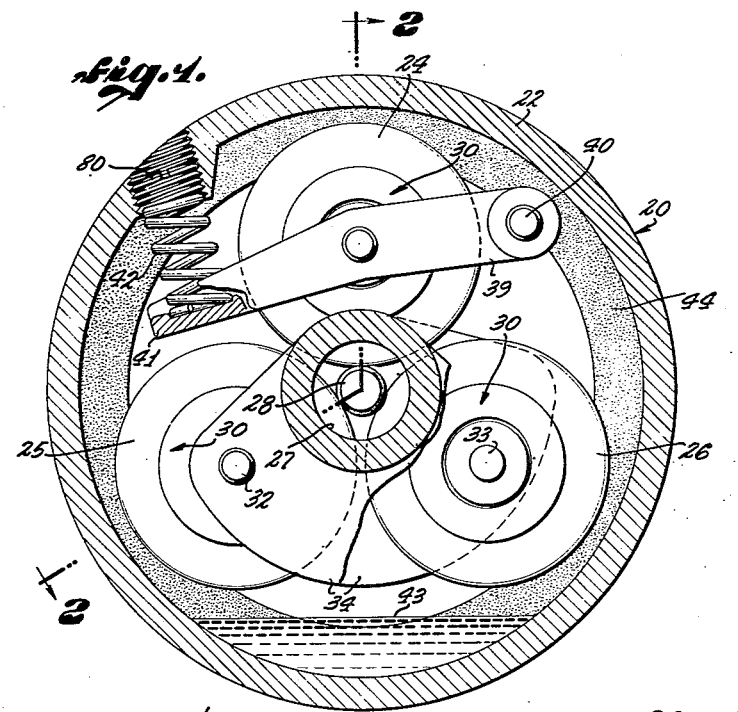
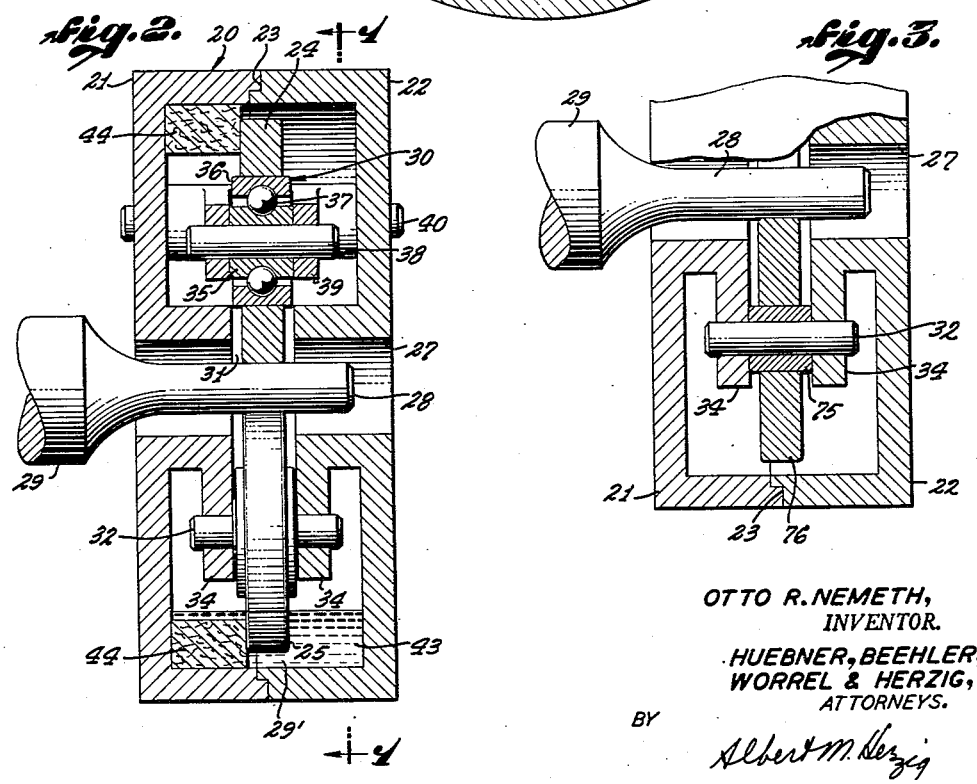
OTTO R. NEMETH,
INVENTOR.
HUEBNER, BEEHLER,
WORREL & HERZIG,
ATTORNEYS.

June 4, 1957 — O. R. NEMETH — 2,794,692
HIGH SPEED BEARING
Filed June 14, 1954 — 2 Sheets-Sheet 2
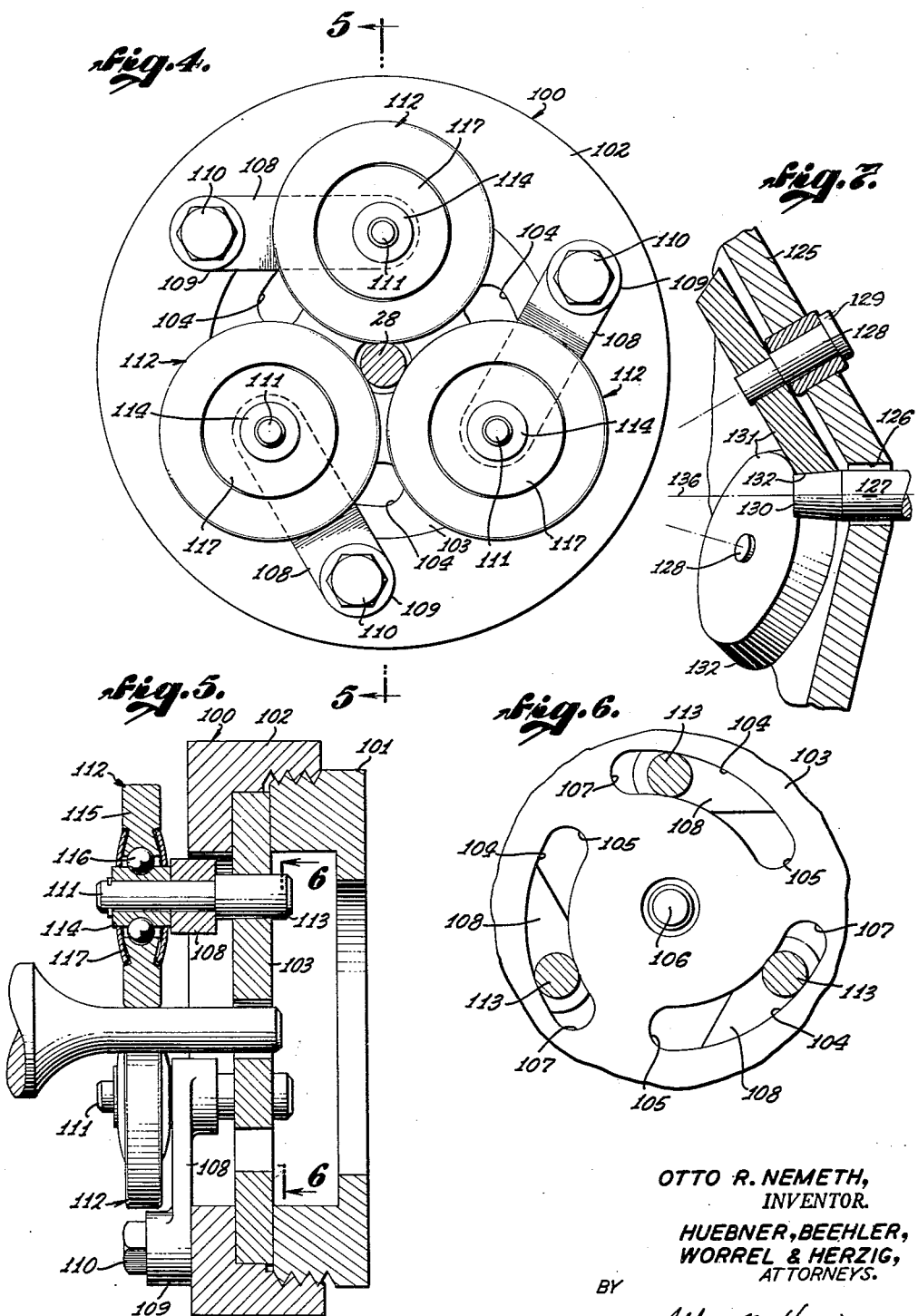
OTTO R. NEMETH,
INVENTOR.
HUEBNER, BEEHLER,
WORREL & HERZIG,
ATTORNEYS.
BY Albert M. Herzig United States Patent Office 2,794,692
Patented June 4, 1957

2,794,692

HIGH SPEED BEARING

Otto R. Nemeth, Los Angeles, Calif.

Application June 14, 1954, Serial No. 436,485

2 Claims. (Cl. 308—203)

This invention relates to anti-friction bearings construction, and more particularly to a high speed anti-friction bearing of new and improved style.

It is among the objects of this invention to provide a new and improved high speed anti-friction bearing in a manner to keep surface bearing speeds at a minimum while permitting desired rapid revolutionary movement of the subject bearing-supported shaft or the like.

It is another object of the invention to provide, in a new and improved high speed bearing, new and improved bearing support means, bearing adjustment means, and bearing housing means, both said high speed bearings being of new and improved utility.

It is among the further objects of the invention to provide mounting means for the bearings of the desired character described by which accurate centering of the bearing assembly and a subject shaft or the like can be achieved without exacting manufacturing tolerances.

It is an object of this invention to provide a new and improved construction and relationship between the adjacent moving surfaces and their bearing mountings whereby sliding friction at the higher speeds involved is reduced to a minimum, and whereby rolling friction at the highest speeds involved is transmitted to slower moving parts and surfaces whose temperature rise during operation is not critical and whose lubrication needs are therefore readily met.

Another specific object of the invention is the provision of a suitably proportioned bearing construction permitting sleeve bearings or bushings to be used for relatively high speed operations.

The invention also has among its objects the provision of improvements in mounting arrangement, proportion and details of structure and combination over prior art devices heretofore intended to accomplish generally similar purposes.

In the drawings:

Figure 1 is a transverse sectional view taken as on a line 1—1 of Figure 2 of a preferred form of bearing structure embodying this invention.

Figure 2 is a transverse sectional view thereof taken as on a line 2—2 of Figure 1.

Figure 3 is a modified form of bearing embodying this invention, sleeves being substituted for balls and raceways of the embodiment of Figures 1 and 2.

Figure 4 is an alternative mounting structure for a bearing embodying this invention, the bearings themselves, apart from their mountings, being optionally of the form of Figures 1 and 2, or the form of Figure 3, for the form illustrated in Figures 4, 5 and 6.

Figure 5 is a sectional view taken as on a line 5—5 of Figure 4.

Figure 6 is a sectional view taken as on a line 6—6 of Figure 5.

Figure 7 is a fragmentary view, in vertical section, of a modified form of thrust bearing embodying this invention.

Referring more particularly to the drawings, having reference first to Figures 1 and 2 thereof, a bearing housing 20 formed as in two halves 21 and 22 joined threadably or as by means of a press-fit at 23, for example, rotatably mounts a number, preferably three, bearing wheels 24, 25 and 26. The housing 20 provides a central recess 27 into which the reduced end 28 of a high speed shaft 29 extends for support upon and between the bearing wheels 24, 25 and 26.

Said housing 20 is also preferably provided with an annular chamber 29' adapted to accommodate the bearing wheels and their respective bearings 30. The wheels extend into the central recess 27 as by means of an intercommunicating passageway 31.

Preferably two of the wheels 25 and 26 are mounted on shafts 32, 33, which are fixed relative to one another and respectively secured as by press-fit into web elements 34, comprising a part of the housing 20. The inner race 35 of the bearing 30 is disposed upon the shaft 32 in optional fixed or rotational relationship thereto, and the outer race 36 is likewise coaxial with the shaft 32 for retaining the bearings 37 which, as shown, are of an anti-friction ball or roller type therein.

The bearing wheel 24 has its pin 38 fixed in a bifurcate arm 39 pivoted as at 40 to the housing 20 so as to provide a free end 41 normally urged radially inwardly toward the shaft 28 as by means of a spring 42 mounted between the housing and said free end 41. The chamber 29' within the housing preferably contains a lubricant such as oil 43 for feeding an oil wick, or the like, 44 disposed therearound in optional touching engagement with the respective wheels 24, 25 and 26. However, the bearing 30 and the associated moving parts can be and advantageously are lubricated by any other method, including oil spray or like systems of lubrication known to those skilled in the art of high speed bearing construction for achieving an optimum degree of lubrication without introducing undesirable frictional influences.

In the use of the instant bearing, the shaft 29 is rotated at a desired speed of approximately a quarter million R. P. M. The reduced diameter of the end 28 itself reduces the effective surface speed of the shaft 29 in the region of its engagement with the bearing wheels 24, 25 and 26. Said wheels are themselves of a diameter considerably larger than that of the reduced axle portion 28, so that the rotational speed of the bearings 30 is correspondingly reduced over what it would be if such axle portion 28 rotated directly against the outer circumferential periphery of the race 36. The increased radius as effectively given the bearings 30 may be varied to suit the desired work conditions, the limitations imposed by the material, and the requirements of lubrication. The bearing wheels 24 may be of any appropriate material, such as metal, including steel, or alloys such as bronze, or hard, resinous materials such as phenolic, nylon, or even rubber, or the like.

The influence of centrifugal forces and resistances due to lubrication and other factors will be taken account of with respect to any particular application within the skill of the art.

By the direct bearing of the wheels 24, 25 and 26, against the reduced axle portion 28, while freeing the balance of the circumferential periphery of the wheels 24, 25 and 26, from other sliding or rolling engagement, the friction induced by the enlarged bearing wheel portion 24 will be substantially limited to the friction of elastic deflection during use. Inasmuch as mere line contact is made by the wheels 24, 25 and 26 with the shaft portion 28, theoretical pure rolling action is obtained, thus reducing frictional forces to a minimum, in the absence of material-compressive and oil film forces. In some high speed applications, the presence of a wick such as 44, in contact with the wheels 24, 25 and 26, is objectionable, As noted, it is possible, and sometimes desirable, to supply little if any lubrication at the reduced axle 28, so that the only need for substantial lubrication is in the balls 37 and their associated raceways in the event the inner race 35 is press-fit on the corresponding shafts 32, 33 and 38.

If lubrication be omitted from the reduced shaft 28, the fluid friction occasioned by the presence of the lubricant can be avoided.

The nature of the materials used on the wheels 24, 25 and 26 and the reduced shaft 28, and the amount of inertia in said wheels, as well as the rate of acceleration and deceleration of the rotation in the shaft 29—28, will determine the extent of undesired sliding friction between said wheels and said shaft portion 28, and hence the amount of desired lubrication.

It is contemplated that the reduced shaft portion 28 will be made as small as permissible considering the radial load upon the shaft 29, while the wheels 24, 25 and 26 will be of the largest possible diameter consistent with space requirements based upon the diameter of said shaft 28. It is also contemplated that where space limitations permit or demand, the wheels 24, 25 and 26 can be staggered axially along the reduced shaft portion 28. By this means interference between said wheels, as seen most clearly in Figure 1, where said wheels be in the same plane and are made of critically larger diameter than in said figure shown, will be obviated.

Referring now to the form of bearing illustrated in Figure 3, all parts are similar to those of Figures 1 and 2, except for the substitution of a sleeve bearing 75, for the ball bearing 30. Consequently, like parts are designated by like reference numerals.

As in said first form, the diameter of the wheel 76 corresponding in function and position to the wheels 24, 25 and 26, is preferably in the order of approximately five times or more the diameter of the reduced shaft portion 28. Lubrication of the modified form of Figure 3 may be by forced circulation or by spray, and, in relatively slower speeds, by immersion, wick-wetting, or the like.

In both the forms of the Figures 1 and 2 and the form of Figure 3, the spring mounting at 42 of the bifurcate arm 39 permits the accurate centering of the shaft 28—29 between the wheels 24, 25 and 26, or, in the case of the staggered mounting of such wheels, the accurate positioning of the projected center line of said shaft between the wheels. A predetermined amount of radial load on the reduced shaft 28 may likewise be imposed by a threaded adjustment 80 upon said spring 42. A rotatable mounting of the entire housing 20 is also contemplated where desired.

Referring now to the alternative modification of Figures 4 through 6, a housing 100 preferably comprises a male threaded portion 101 and a female threaded portion 102 adapted to clamp between them a plate 103. Said plate 103 is provided with slots 104 of arcuate configuration, as seen in Figure 6, each having an end 105 disposed closer to the center 106 of the plate than the opposite end 107 of the corresponding slot.

Arms 108 pivotal and optionally clampable at an end 109 by means of bolts 110, carry stub shafts 111 mounting bearing wheels 112. The stub shafts 111 have an end 113 optionally enlarged and adapted to make sliding engagement within the slots 104 respectfully. The outer ends of the stub shaft mount, for example, an inner race 114, and an outer race 115 comprising the outer race and the main body of the bearing wheels 112. Ball bearings 116 are confined between said inner and outer race members 114 and 115. Retainers 117 are also provided for sealed lubrication of the balls 116 and to retain the parts in alignment.

Accurate centering of the reduced portion 28 of the shaft 29 with any predetermined degree of desired tightness is accomplished by rotation of the plate 103, relative to the stationary mounted female housing member 102, and its clamped securement relative to said female member by means of the male member 101.

The same considerations relative to operation and use of the form of Figures 4 through 6 apply as previously discussed in connection with the preceding forms of this invention.

Referring now to the modified form of thrust bearing illustrated in Figure 7, a housing 125, apertured as at 126 for the rotatable reception of a shaft 127, also supports at radially spaced positions—preferably three in number—around the shaft 127, a plurality of stub shafts 128 mounted in suitable sleeves 129.

The shaft 127 is tapered at 130. Bearing wheels 131 are respectively mounted upon the stub shafts 128, and the circumferential peripheries of said bearing wheels are designed to engage the frusto-conical tapered end 130 of the shaft 127. Said circumferential peripheries 132 are mounted and tapered at such angles with respect to the frusto-conical portion 130 that both said wheel peripheries and the surface of said frusto-conical portion 130 define frustrums of cones whose projected apexes meet at a common point. As a result, the projected axes of the wheels and the projected axis 136 of the shaft 127 also meet at said point. By this construction, sliding friction occasioned by the differential surface speeds at the places of contact between the wheels and the frusto-conical portion 130 is obviated.

The wheels 131 are preferably adjustable relative to the shaft 127, by means similar to that illustrated and described in connection with the preceding embodiment of this invention, and the description thereof is not therefore repeated.

In all of the above embodiments it has been found advantageous to use as a shaft a hollow tube rather than a solid rod—for example, a shaft having a diameter of .1 of an inch advantageously has a wall thickness of .01 of an inch. Thereby the shaft can flexibly absorb non-round errors and vibration due to the high speed rotation of the shaft. Spring loading of the shaft and wheels, as illustrated for example in Figure 1 of the drawings, is unnecessary when the shaft is hollow or tubular, and the form of adjustment of the wheels relative to the shaft illustrated for example in Figures 4 through 6, is preferable. If the shaft of the embodiment of Figure 7 is made hollow at its end, it is desirable to retain a uniform wall thickness in the frusto-conical portion.

The invention features the provision of a new and improved bearing and housing construction in which substantially friction-free bearing wheels are provided, making line engagement with a preferably reduced diameter high-speed shaft, the rest of the circumferential periphery of the bearing wheels being preferably free from all other frictional or rotational engagement, but being mounted for rotation upon shafts radially spaced from the main rapidly rotating shaft and having either anti-friction or sleeve bearing connection therewith.

This invention also features the provision of bearing surfaces adapted to bring frictional, centrifugal and heat losses to a minimum, so that high speed axle operation is achieved. In addition, the invention features the provision of improved cooperative bearing wheels having new and improved assembly and shaft-centering characteristics adapted for ready mass production with extreme accuracy but so as to avoid correspondingly high manufacturing requirements normally required to achieve equivalent accuracy.

It is to be understood that the foregoing description of the invention is explanatory thereof and various changes in the shape and details of the illustrated construction may be made, within the scope of the appended claims, without departing from the spirit of the invention.

I claim:

1. A high speed bearing construction comprising a housing, at least three bearing wheels mounted in the housing for free rotation relative to a common center, at least one arm pivotally mounted inside the housing and carrying one of said bearing wheels for adjusting the same radially with respect to said center, and an axle concentric with said center, the circumferential periphery of said axle being in engagement with the circumferential periphery of said bearing wheels, said bearing wheels supporting said axle and being rotatable therewith by sole engagement of said bearing wheels with said circumferential periphery of said axle, said pivotally mounted arm being operatively associated with a slotted plate means provided with a slot having a radial and circumferential directional component for guiding the shaft of said one bearing wheel therealong.

2. In a high speed bearing construction, comprising a housing, bearing wheels, three in number, mounted in radially spaced relationship to one another in the housing, an axle of lesser diameter than the diameters of said bearing wheels, said bearing wheels being mounted in radially spaced relationship around a common center, said axle being mounted on said center and its circumferential periphery engaging the circumferential peripheries of said bearing wheels, and three arms pivotally mounted inside the housing means for carrying said wheels radially towards and away from said center for engagement against said axle and for urging said axle against said other bearing wheels, a disc centered on the common center inside the housing and provided with three slots each having a radial and a circumferential directional component and each adapted to guide a bearing wheel shaft along the slot when the disc is turned about the common center for radially adjusting the bearing wheels.

References Cited in the file of this patent
UNITED STATES PATENTS

| | | |
|---|---|---|
| 1,704,205 | Oakes et al. | Mar. 5, 1929 |
| 1,748,174 | Hirvonen | Feb. 25, 1930 |
| 1,755,238 | Bryant | Apr. 22, 1930 |
| 1,775,408 | Raule | Sept. 9, 1930 |
| 1,827,968 | Bryant | Oct. 20, 1931 |
| 2,399,446 | Morgan | Apr. 30, 1946 |
| 2,509,384 | Workman | May 30, 1950 |
| 2,676,276 | Parker | Apr. 20, 1954 |

FOREIGN PATENTS

| | | |
|---|---|---|
| 908,440 | France | Apr. 9, 1946 |